March 21, 1967

C. R. BEARY 3,310,616

METHOD OF INSULATING A SERIES OF RECTANGULAR
REFRIGERATOR CABINETS

Filed Nov. 6, 1964

INVENTOR.
Charles R. Beary
BY Carl A. Stickel
His Attorney

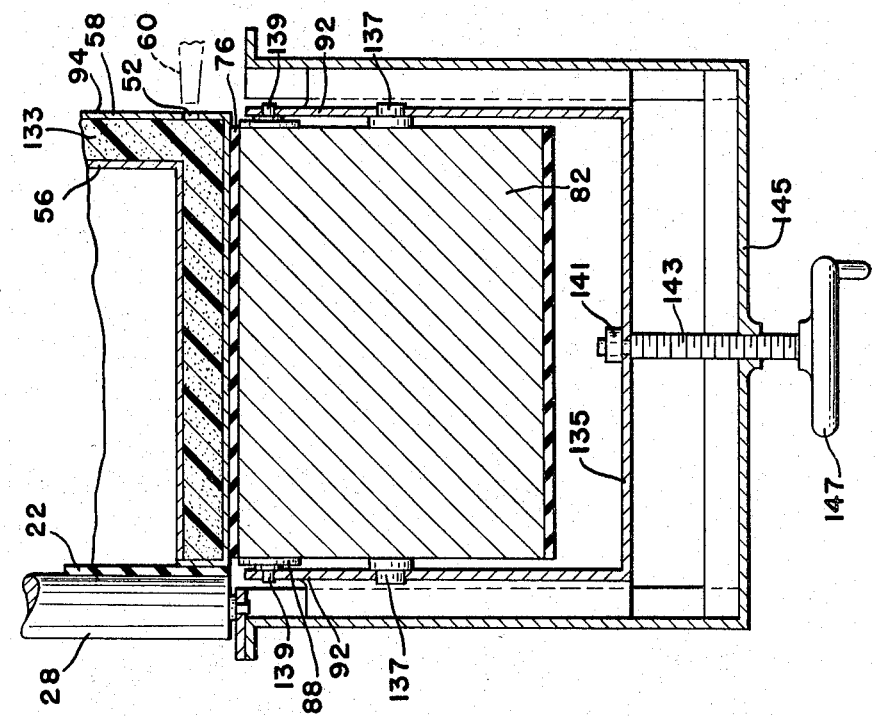
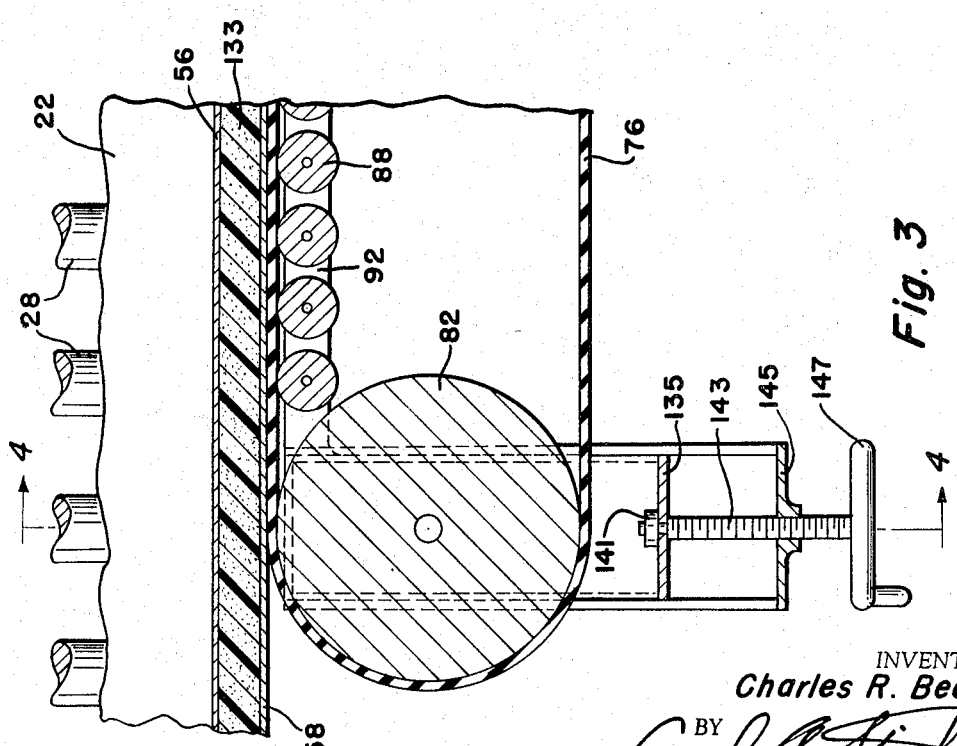

March 21, 1967

C. R. BEARY 3,310,616

METHOD OF INSULATING A SERIES OF RECTANGULAR
REFRIGERATOR CABINETS

Filed Nov. 6, 1964

INVENTOR.
Charles R. Beary
BY
*Carl A. Stickel*
His Attorney

March 21, 1967

C. R. BEARY 3,310,616

METHOD OF INSULATING A SERIES OF RECTANGULAR
REFRIGERATOR CABINETS

Filed Nov. 6, 1964

INVENTOR.
Charles R. Beary
BY
Carl A. Stickel
His Attorney 3,310,616
METHOD OF INSULATING A SERIES OF REC-
TANGULAR REFRIGERATOR CABINETS
Charles R. Beary, Dayton, Ohio, assignor to General
Motors Corporation, Detroit, Mich., a corporation of
Delaware
Filed Nov. 6, 1964, Ser. No. 414,487
8 Claims. (Cl. 264—45)

This application is a continuation-in-part of my copending application Ser. No. 180,089, filed Mar. 16, 1962, and now abandoned.

This invention pertains to the manufacture of refrigerating apparatus and more particularly to the insulating of refrigerator cabinets.

It has been recognized that certain foam resins permanently containing in their cells vapors having a low coefficient of heat transmission provide such superior insulating qualities that the thickness of insulation required for refrigerator cabinets is dramatically reduced. However, although the cost of such foam materials has been reduced, the pressures generated during the foaming period have required strong, heavy, expensive molds and fixtures. When casting foam materials within the walls of refrigerator cabinets, it has been necessary to use heavy, expensive molds and fixtures to prevent the distortion of the walls of the cabinet by the pressures created by the foam materials during the foaming thereof.

It is an object of this invention to provide a practical, inexpensive process for casting foam insulation in the insulation spaces of refrigerator cabinets without the use of expensive fixtures and molds for each cabinet.

It is another object of this invention to provide an inexpensive method of supporting the walls of refrigerator cabinets during the foaming and curing of the foam resin insulation in the walls thereof which will not require labor in the application or removal thereof.

It is another object of this invention to provide an inexpensive method of automatically supporting the walls of refrigerator cabinets during the foaming and curing of the foam insulation which is applied to the cabinets through multiple mixing heads.

Such foam resins are also useful in filling and insulating other hollow walled structures such as refrigerator cabinet doors in which the foam material is located between the inner and outer walls of the door. The pressures generated by the foam material within the door during the casting thereof has also required relatively expensive fixtures for supporting the inner and outer walls. The cost of such fixtures as well as the cost of putting the inner and outer walls of the door into the fixtures and fastening the fixtures before the casting and unfastening the fixtures and removing the completed door therefrom has retarded the use of this excellent insulating material for doors and the like.

It is another object of this invention to provide an inexpensive method for automatically supporting the walls of walled structures such as insulated doors during the foaming and the curing of the foam insulation.

These and other objects are attained in the form shown in the drawings in which the multiple sided cabinets are placed one by one face down upon an endless belt-type conveyor substantially unyieldingly confined and firmly supported by a series of rollers beneath the belt. The cabinets are placed alternately end for end on the conveyor so that the tops of the cabinets are closely adjacent and the bottoms of the cabinets are closely adjacent. If desired, the finish upon the tops of the cabinets may be protected by providing a substantially rigid sheet in-between the tops of such a surface as to protect the surface finish upon the tops thereof. Prior to being so placed on the conveyor, the inner walls of the cabinet may be provided with a reinforcing fixture.

The insulation space within the cabinet between the inner and outer walls thereof is charged with the foam-forming materials in a proper amount through six openings in the rear wall near the side edges thereof which are formed by striking outwardly tabs from the rear wall. The remainder of the rear wall may be provided with minute perforations for allowing the escape of air and gases from the insulation space and to permit a visual observation of the complete filling of the insulation space through the filler openings provided. The filler openings may then be closed by pushing the tabs downwardly into the plane of the remainder of the rear wall.

To prevent the bulging of the top walls, the cabinets are forced tightly together so that any tendency of the top walls to bulge will be counteracted by a similar tendency in the adjacent top walls so that the expanding forces will be exerted against each other and, thus, be substantially canceled out. The side walls are prevented from bulging by two endless belt conveyors on each side substantially unyieldingly confined and firmly supported by a series of individual rollers which contact the side walls and forcibly prevent their bulging during the expansion of the foam within the insulation space. An endless belt conveyor also firmly supported by a series of individual rollers is provided in contact with the rear wall. All of these endless belt conveyors are made adjustable so that the apparatus may be used for different sizes of cabinets. If required for the curing of the foam material, the endless belt conveyors may extend through an oven or other temperature control zone. The cabinets may be removed from the conveyor at the opposite end or extend onto another conveyor for completion. The reinforcing fixture for the inner walls may then may be removed.

The conveyor may also be adjusted for similar treatment of the doors for such refrigerator cabinets. Said doors ordinarily have an outer sheet metal walled structure with inturned flanges to which at some suitable stage in the assembly there is fastened an inner wall structure having integral door shelves which is frequently termed the inner pan and at present is made of plastic sheet material. In one form of the application to the doors, the foam-forming material is first applied to the interior of the outer sheet metal walled structure of the door after it has been placed on the conveyor. The walled structure then passes between upper and lower belts with the upper belt being surfaced with a sheet of material such as polyethylene, or polypropylene, or polytetrafluoroethylene. The foam-forming material expandls while the multiple sided hollow walled sheet metal structure is confined between the belt conveyors and continues between the belt conveyors until the expansion of the foam-forming material is completed. The polyethylene sheet may be removed from the door or it may be cut and remain in place covering the surface of the foam.

In a second alternate form of the invention, the outer sheet metal wall structure of the door may receive the charge of foam-forming materials and thereafter the inner door pan may be applied to the outer walled structure and the two passed and substantially unyieldingly confined between the belt conveyors until the expansion is completed. The foam will serve to join the two parts of the door to provide a unitary structure.

In a third alternate form of the invention, the inner pan is fastened to the outer sheet metal multiple sided hollow walled structure of the door and the charge of foam-forming material is introduced through an aperture in the inner pan or through the sheet metal portion of the door. After this the door structure is carried and substantially unyieldingly confined between belt conveyors until the expansion of the foam is completed.

In the fourth alternate form of the invention, the outer sheet metal multiple sided hollow walled structure of the door is charged with foam-forming material and passed and substantially unyieldingly confined between belts until the expansion of the foam-forming materials is completed. In this particular form the entire conveyor system is inclined so that the walled structure will be continuously inclined causing the charge of the foam material to flow to the lower edge of the walled structure and expand in one direction from this edge while the structure is between the belt conveyors. The upper belt conveyor covers the top of the walled structure and is provided with a substance or surface to which the foam material will not adhere such as polyethylene or polypropylene or an anti-sticking coating such as wax.

Further objects and advantages of the present invention will be apparent from the following description, reference being had to the accompanying drawings wherein a preferred embodiment of the present invention is clearly shown.

In the drawings:

FIG. 3 is a fragmentary sectional view taken along the line 3—3 of FIG. 1;

FIG. 4 is a fragmentary sectional view taken along the line 4—4 of FIG. 3;

Figure 7:
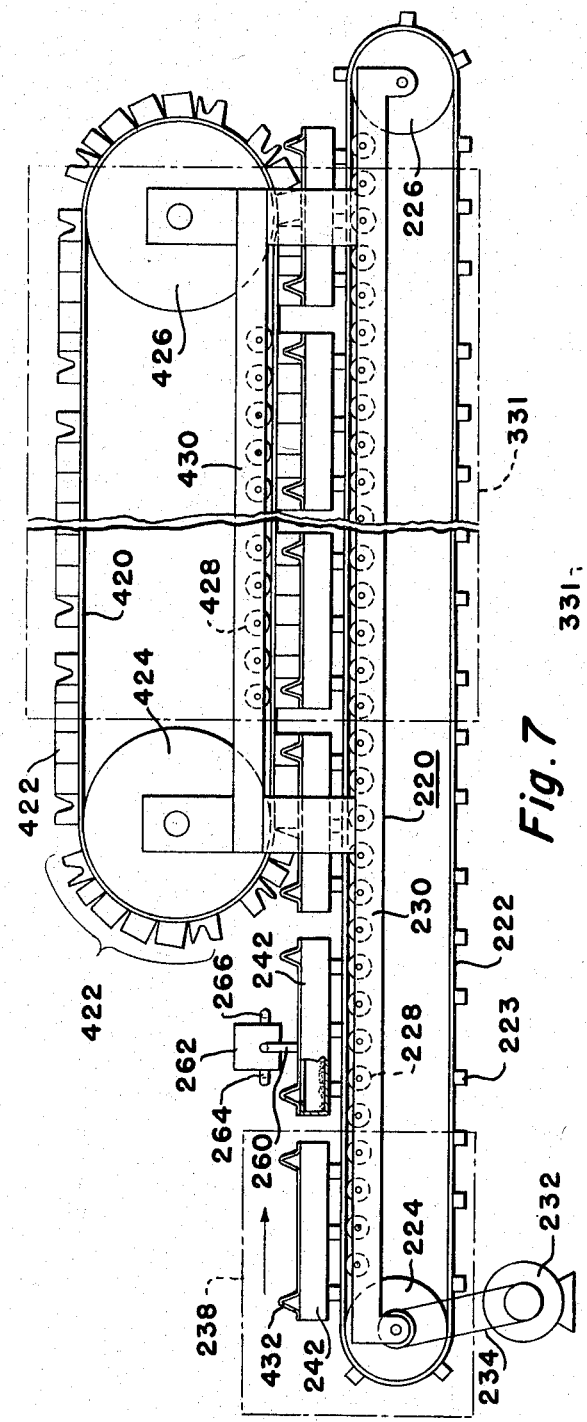
Figure 8:
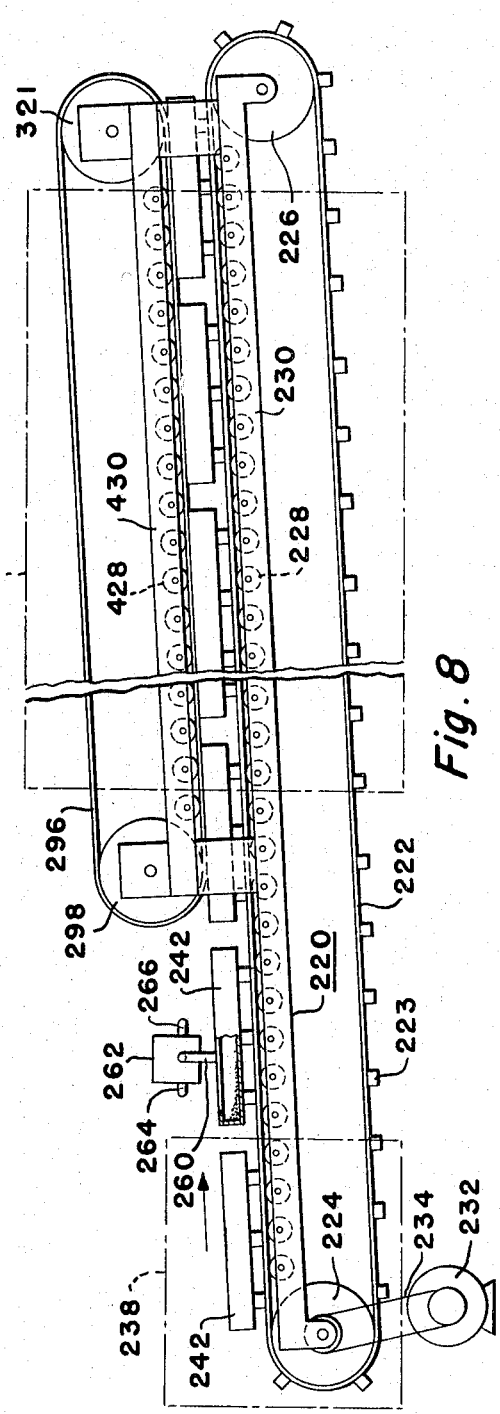

FIG. 7 is a view in elevation, partly diagrammatic, of another form of belt conveyor apparatus for the introduction of foam-forming material into the walled structure of refrigerator cabinet doors in which the foam-forming materials is introduced through an aperture in the inner door pan; and FIG. 8 is a view in elevation partly diagrammatic in which the belt conveyor apparatus is inclined so as to provide a better distribution of the foam-forming materials in the outer substantially unyieldingly walled structure of the refrigerator door as it is carried between the upper and lower belts.

Figure 1:
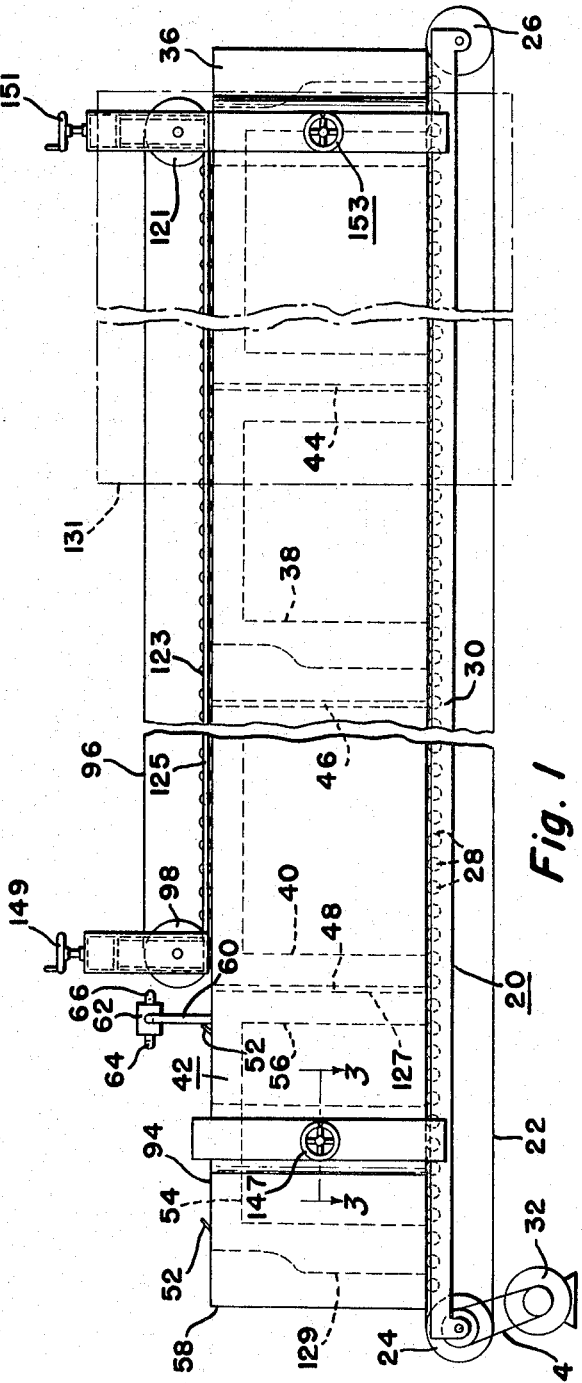
FIG. 1 is a view in elevation, partly diagrammatic, of one form of apparatus for carrying out my improved method.
Figure 2:
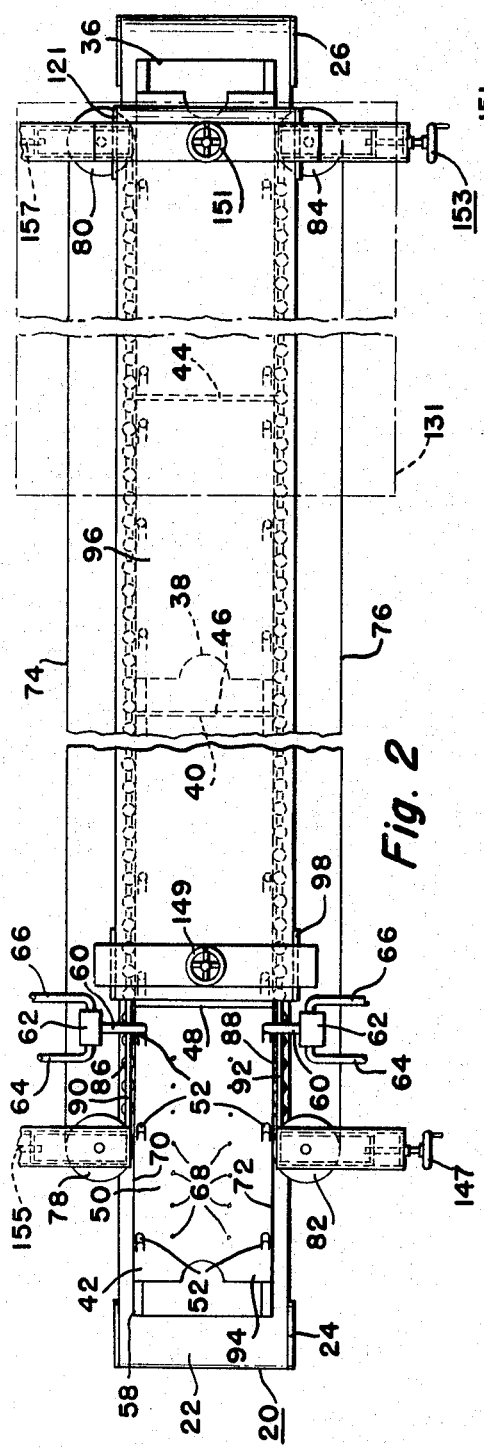
FIG. 2 is a top view of the apparatus shown in FIG. 1.

Referring now to the drawings and more particularly to FIGS. 1 and 2, there is shown a conveyor 20 in the form of an endless belt 22 mounted upon end rollers 24 and 26 and substantially unyieldingly confined and firmly supported in-between the end rollers 24 and 26 by a series of idler rollers 28 mounted in the longitudinal frame 30. This conveyor 20 is preferably driven by an electric motor 32 through pulley and belt means 34 or some other type of suitable driving arrangement. Prior to placing the cabinets 36 to 42 on the conveyor 20, the inner walls 56 of each may be provided with reinforcing fixtures to prevent any tendency to collapse if they are not self-sustaining under external pressure. Alternatively, if it is desired to postpone the insertion of the inner walls 56 until after the foaming of the insulation, an inner mold of substantially the same external surface may be substituted for each of the inner walls. Preferably such an inner mold would be covered with an anti-sticking material such as polyethylene or tetrafluoroethylene sheet or coating to enable it to be readily removed after the foaming.

According to my invention, the refrigerator cabinets, for example, those designated by the reference characters 36, 38, 40 and 42 are placed with their open front sides downwardly and arranged so that they alternate end for end so that the tops of each adjacent cabinet are positioned closely adjacent each other and the bottoms are also positioned closely adjacent each other.

Preferably, to prevent damage to the adjacent top surfaces and also the adjacent bottom surfaces of the cabinet, there is placed between each of the cabinets a board or sheet such as designated by 44, 46, 48 of some suitable material, such as paper board or cardboard or wood surfaced with cloth or some suitable elastomeric material. The cabinets with the boards in-between are placed tightly together on the conveyor. Distributed along the sides of the backs 50 of each of the cabinets are six struck-out tabs 52 forming filler openings. For filling the insulation space 54 between the inner walls 56 and the outer walls 58 of each of the cabinets, I supply foam-forming materials through flexible conduits 60 which are placed in the filler openings provided by the struck-out tabs 52 on the backs 50 of each of the cabinets. The foam-forming materials are supplied to the conduits 60 by the mixing apparatus 62. The foam-forming materials are preferably supplied to the mixing apparatus in the form of two components which are separately supplied to the mixing apparatus 62 through the separate conduits 64 and 66.

For specific foam-forming materials, I prefer to use those shown in the John C. Rill, Jr., application Ser. No. 809,702, filed Apr. 29, 1959, assigned to the assignee of the present invention.

Another specific example of foam-forming materials is as follows.

An ethylene glycol-adipic acid polyester having a hydroxyl number of about 430, an acid number of about 1.50 and a negligible water content is reacted with toluene diisocyanate to produce an isocyanate modified polyester having an isocyanate equivalent of about .80 per 100 grams of the isocyanate modified polyester. A mixture of 100 parts by weight of this isocyanate modified polyester, .50 part by weight of polyoxyethylene sorbitan monopalmitate emulsifier, and 30 parts by weight of trichloromonofluoromethane (F-11) is kept cool in a tank, such as below 50° F. A second mixture of 60 parts by weight of the ethylene glycol-adipic acid polyester, 12 parts by weight of ethylene glycol, and .25 part by weight of dimethyl ethanolamine, .25 part by weight of polyoxyethylene sorbitan monopalmitate emulsifier is kept in another tank.

The mixtures from the two aforesaid tanks are supplied separately through the supply conduits 64 and 66 to the mixing chambers 62 where it is mixed in the ratio of 130.5 parts by weight of the first mixture to 72.5 parts by weight of the second mixture. The mixture is then discharged from each of the mixers 62 through the conduits 60 and the filler openings provided by the struck-out tabs 52 into the insulation space. Preferably, either two mixing apparatus 62 and the supply conduits 60 are provided on either side of the conveyor 20 or, if desired, three on each side may be provided, one for each filler openings so that the filler openings may be used simultaneously. The backs 50 of the cabinets may be provided with a plurality of uniformly distributed small openings 68 affording a visual indication when the insulation space 54 is completely filled with foam and also providing an escape for the displaced air within the insulation space 54.

To prevent the bulging of the sides 70 and 72 of the cabinets, I provide above the conveyor 20 on each side of the cabinets 36 and 42 two endless belt conveyors 74 and 76 supported at their ends by rollers 78 and 80 in the first instance and 82 and 84 in the second instance. Between these rollers 78 and 80, there are provided a series of individual rollers 86 and 88 supported respectively by the frames 90 and 92. These belt conveyors 74 and 76 are held firmly against the sides 70 and 72 of the cabinets by the rollers 86 and 88 so as to prevent the bulging, scratching, and dinging of the sides during the foaming of the foam-forming materials in the insulation space 54. After the insertion of the foam-forming materials into the insulation space 54 in sufficient quantity, the tabs 52 are forced downwardly by any suitable tool to close the filler openings.

The rear walls 94 which are positioned uppermost in FIG. 1 are likewise prevented from bulging by the endless belt conveyor 96 having the rollers 98 and 121 at the opposite ends and a series of small supporting rollers 123 mounted in-between the rollers 98 and 121 upon a frame 125 which rollers substantially unyieldingly confine and firmly support the belt. The tops 127 of the cabinets are positioned in opposed relation with the boards or sheets 44 and 48 in-between. Since the cabinets are positioned tightly together and are held together by the conveyors 20 and the endless belt conveyors 74, 76 and 96, the pressures in the insulation spaces on the opposite sides of the tops 127 of the cabinets will oppose each other and be thereby canceled out so as to prevent distortion of the top walls of the cabinet during the foaming operation while the side and rear walls are prevented from bulging during this operation by the endless belts 74, 76 and 96. The bottom walls 129 of the cabinet are of an arched irregular shape and resist bulging. However, since they are normally concealed, any slight distortion of these walls is of substantially no consequence.

Some foam-forming materials require curing at elevated temperatures, such as 125° F. If such curing should be necessary or desirable, the conveyor 20 and the endless belt conveyors 74, 76 and 96 may extend through an oven designated diagrammatically by a dot-dash line and the reference character 131. Such oven may be of sufficient length and temperature to provide the cure for the foamed insulation within the cabinets.

To make it possible for various sized cabinets to be processed in this apparatus, each of the belt conveyors 74, 76 and 96 are made adjustable by apparatus of the type shown in FIGS. 3 and 4. Each end of each belt conveyor is provided with a movable U-shaped frame 135 which includes two apertures receiving the end bearings 137 of the end rollers supporting the belts, such as the belt 76. These U-shaped movable frames are also connected by the projections 139 extending through apertures in the frame 135 to the longitudinal frames, such as the longitudinal frame 92 for example. A thrust bearing 141 connects the yoke of the U-shaped frame 135 to the end of a screw 143 which is threaded through the yoke of a stationary U-shaped frame 145 and on the outer end is provided with a manually operable hand wheel 147 to turn the screw so as to move the frame 135 to any position desired for suitable adjustment. The belt conveyor 76 is provided with a similar adjustment mechanism 153 at the opposite end adjacent the roller 84. Similarly, the belt conveyor 74 is provided with similar adjustment means at the opposite ends designated by the reference characters 155 and 157. The upper belt conveyor 96 is also provided with similar adjustment means at its opposite end designated by the reference characters 149 and 151.

Since the belt conveyors 74, 76 and 96 can be adjusted to the exact size of the cabinets, they will substantially prevent any bulging of the walls of the cabinet due to internal pressures created by the foam 133 as the foaming process is completed. After the foaming process is completed, the foam will not expand further and, after curing, the cabinets can be removed from the end of the conveyor 20 either manually or by other conveyor means. While I have shown a belt-type conveyor 20 as one illustration of a suitable conveyor for the cabinets, other types of conveyors may be used, if desired.

Figure 5:
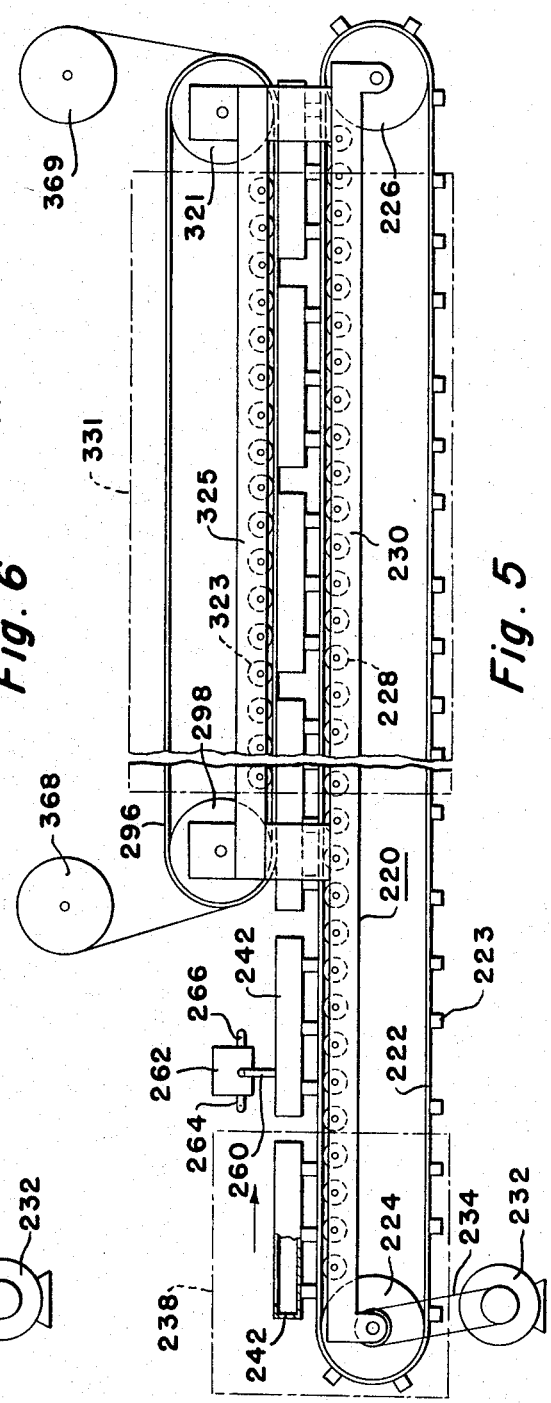
FIG. 5 is a view in elevation, partly diagrammatic, of the conveyor apparatus arranged for carrying out the application of foam insulation material to the walled structure of the doors of refrigerator cabinets.

As shown in FIG. 5, the conveyor apparatus may also be used for the confining of multiple sided hollow walled structures forming doors of refrigerator cabinets after they have been charged with foam-forming material. As shown in FIG. 5 there is provided a lower belt conveyor 220 in the form of an endless belt 222 mounted upon the end rollers 224 and 226 and supported in between by a series of idler rollers 228 mounted in the longitudinal frame 230. The end roller 224 is driven by a drive motor 232 through a drive belt 234. The belt conveyor 222 may be provided with special supporting blocks 223 for supporting the outer sheet metal multiple sided hollow walled structure 242 of the doors. Through this arrangement the outer walled structure 242 may be provided with handles, trimming and hinge brackets prior to the foaming operation. Also the outer walled structure may be provided any desired ornamental configuration. However, if the outer surface of the door is flat and not provided with a projecting handle, the outer wall structure 242 may be placed directly on the surface of the belt conveyor 222 and the supporting blocks 223 may then be omitted.

The outer walled structures 242 are placed on the blocks 223 above the end roller 224 as illustrated in FIG. 5. If desired this portion of the belt conveyor may be provided with a preheat oven 238 which may be maintained at temperatures between 110° F. and 165° F. or specifically at 150° F. This oven 238 may be used to preheat the outer walled structure 242 before the foam-forming materials are introduced into the walled structures 242. The foam-forming materials used may be similar to those described above and may be similarly introduced from a mixing apparatus 262 through a delivery conduit 260 into the interior of the wall structure 242 prior to the time the wall structure is carried between the lower belt conveyor 222 and the upper belt conveyor 296. The foam-forming materials are preferably supplied to the mixing apparatus 262 in the form of two components which are separately supplied through the separate conduits 264 and 266 in the same manner that the same materials are supplied to the refrigerator cabinets illustrated in FIGS. 1 and 2.

Immediately to the right of the foam charging station in FIG. 5 is the upper endless belt conveyor 296 having the end rollers 298 and 321 at its opposite ends and a series of small supporting rollers 323 mounted in between the rollers 298 and 321 upon a frame 325 which rollers substantially unyieldingly confine and firmly support the belt. The foam charged into the walled structures 342 expands to fill the interior thereof. This foam is confined by the upper belt conveyor 296. The entire upper belt 296 and its supporting arrangement may be provided with an adjusting arrangement similar to that in FIGS. 1 and 2. To prevent the upper belt conveyor 296 from sticking to the foam, the belt may be made with a special polytetrafluoroethylene "FEP" coating or polyethylene or there is provided a roll of material 368 which feeds a sheet over the surface of the belt conveyor 296 around the end roller 298 and between the belt conveyor 296 and the top of the wall structures 242. Preferably this sheet material is polyethylene or polypropylene or polytetrafluoroethylene sheet which does not readily adhere to the foam material. At the opposite end of the endless belt conveyor 296 this material may be wound up for reuse in a second roll 369. The upper belt conveyor 296 and the sheet material from the roll 368 limit the expansion of the foam-forming material and confines it to the interior of the walled structure 242. The foam-forming material expands during the passage of the walled structures between the belt conveyors and fills the entire interior of each of these walled structures forming the outer portion of the door.

If desired, it is not necessary to remove and rewind the sheet material into a roll 369 but this sheet material may be left on the top of the walled structures and later cut apart so as to provide a sheet surface for the foam. For this use plastic sheets are not required since a sheet of paper will serve the purpose. The conveyor belt mechanism may be provided with a curing oven in the section between the rolls 298 and 321 such as is indicated diagrammatically by the reference character 331 applied to the dot-dash outline. Similar temperates may be maintained for this oven 331 as for the ovens 131 or 238.

Through this arrangement, the walled structures 242 are confined sufficiently between the belt conveyors 222 and 296 to cause a foam to fill the walled structures and yet prevent the walled structures from bulging under the expansion pressures of the foam. The side belt conveyors shown in FIGS. 1 to 4 are ordinarily not used for the doors since the flanged edges of the walled structures 242 are sufficiently stiff and the lateral expansion sufficiently small that there is no objectionable bulging at the sides or edges. After the foamed walled structures emerge from the passage between the belt conveyors, the inner door pan may be applied and the doors assembled to the remainder of the refrigerator cabinets which may be made as illustrated in FIGS. 1 to 4.

Figure 6:
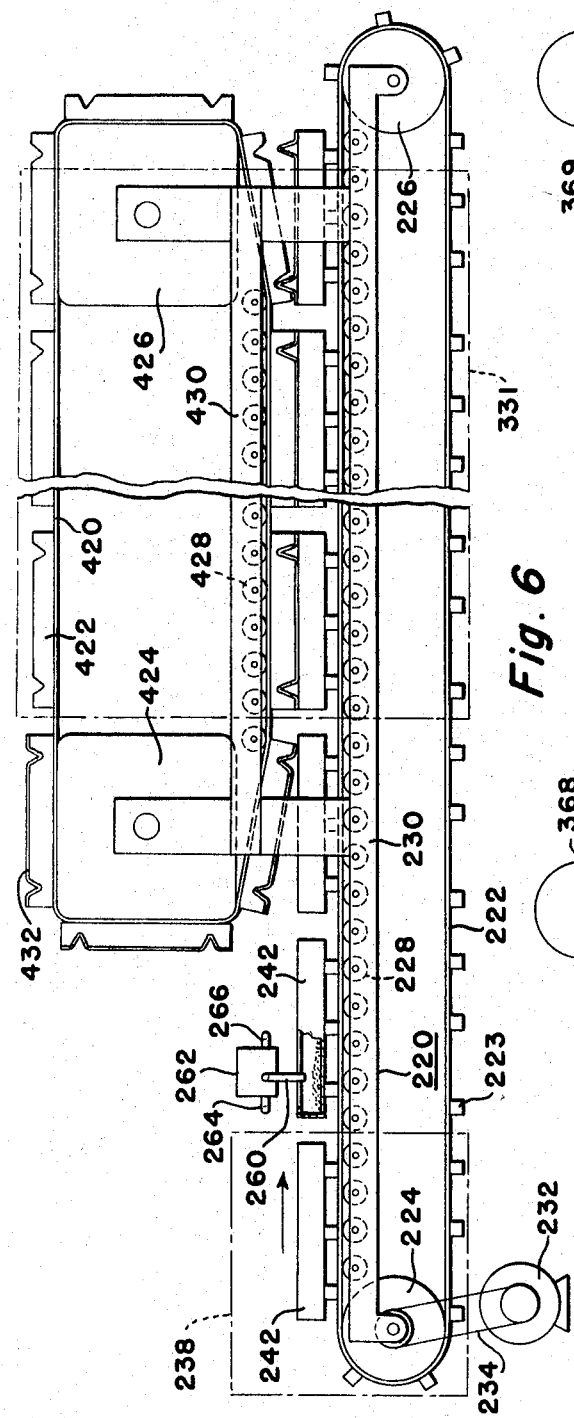
FIG. 6 is a view in elevation, partly diagrammatic, of another form of belt conveyor arrangement for the application of foam insulation to the walled structure of refrigerator doors in which the inner door pan is applied after the charge of foam-forming material is introduced.

In FIG. 6, there is illustrated a variation of the method shown in FIG. 5 in which a similar lower belt conveyor system is used and the multiple sided hollow walled structures 242 are also similar and all bear the same reference characters. In this form, however, the upper belt conveyor arrangement is different. In this upper belt conveyor arrangement the belt conveyor 420 is of the link belt type generally and provided with mold blocks 422 on the outer surface. The foam mixer 262 supplies a charge of foam-forming materials to each of the walled structures 242 after they emerge from the preheat oven 238 and before the inner pans 432 are applied. Square sprockets 424 and 426 are provided for supporting the opposite ends of the belt conveyor while the idle rollers 428 support the bottom of the belt conveyor and in turn are supported by the frame 430. At the station above the sprocket 424, the inner door pans 432 are applied to the properly contoured mold blocks 422 and fit sufficiently tight to be held thereon. The entire upper belt 420 and its supporting arrangement may be provided with an adjusting arrangement similar to that in FIGS. 1 and 2.

As the inner pans 432 are carried around by the sprocket 424 they are applied to the walled structures 242 and carried by the blocks 422 in synchronism with the walled structure 242 between the upper belt conveyor 420 and the lower belt conveyor 222. As the walled structures 242 and the inner door pans 432 are carried between the upper and lower belt conveyors 420 and 222, the foam-forming materials will expand and spread throughout the interior of the space confined by the walled structures 242 and the inner door pan 432. The upper and lower belt conveyors 420 and 222 prevent the expansion of the foam-forming materials from bulging the walled structures 242 and the inner door pan 432. The foam material will bind the walled structures 242 and the inner pans 432 together to form a rigid unitary door structure. The foam may be cured in the curing oven 331 which applies heat at a suitable temperature to the walled structures 242 and the door pans 432 during and after the foaming of the foam-forming materials. The completed door structure is then removed at the end of the lower belt conveyor 222.

If desired the inner door pans 432 need not be applied at the sprocket 424 but instead the blocks 422 may be provided with an anti-sticking surface or mold release agents and merely serve as contour molds for the foam-forming material over the open top of the wall structures 242. The door structures 242 may then be removed from the lower conveyor belt 222 with the foam properly contoured to receive the inner door pan. This arrangement will avoid any difficulties due to the difference in expansion of the inner door pan and the foam and the walled structures 242.

In the form shown in FIG. 7, the lower belt conveyor and the upper belt conveyor are similar to those in FIG. 6 and carry the same reference characters. The multiple sided hollow walled structures 242 and the inner door pans 432 are likewise similar and bear the same reference characters. However in this form, the wall structures 242 have the inner door pans 432 fastened thereto prior to placing them on the lower belt conveyor 222.

The door pan 432 or the walled structure 242 in this form is provided with an aperture through which the foam-forming materials issuing from the mixing apparatus 262 through the conduit 260 pass into the space within the walled structures 242. The sprocket 424 and the upper belt 420 carries the blocks 422 on top of the inner door pan 432 and hold the inner door pan 432 in synchronism with the walled structures 242 between the belt conveyors 420 and 222 which prevent their bulging during the expansion of the foam-forming materials. The upper belt conveyor 420 and its supporting arrangement may be provided with an adjusting arrangement similar to that shown in FIGS. 1 and 2. The foam-forming materials expand between the upper and lower belt conveyors and are cured and removed at the end of lower belt conveyor as described in connection with FIG. 6.

In FIG. 8 another modified arrangement is shown in which the lower belt conveyor 222 is inclined. The upper belt conveyor 296 is similarly inclined along with their idler supporting frames. The sprockets or rollers 226 and 321 are placed at a higher elevation than the rollers or sprockets 224 and 298. The frames 230 and 430 are similarly inclined. The purpose of this is to obtain a more desirable distribution of the foam-forming materials which are introduced from the mixing apparatus 262 through the conduit 260 into the multiple sided hollow walled structures 242. When the belt conveyors are inclined as in FIG. 8, the foam-forming materials will flow down to the left or lowermost edge of each of the walled structures 242 so that the foaming will begin at this edge and proceed uniformly to the right or upwardly. This provides a particularly uniform foamed product having high insulating value. If desired the belt conveyors shown in FIGS. 5 to 7 may be similarly inclined to obtain similar results.

The belt conveyor 296 may be provided with an anti-sticking surface of some suitable form of wax or polyethylene or polypropylene or some suitable mold release agent. The upper and lower belt conveyors 296 and 222 confine the walled structures to 242 so that the foam-forming materials will be limited in their expansion and will spread uniformly throughout the interior thereof. A preheating oven 238 as well as a curing oven 331 maintained at temperatures hereinbefore specified may be provided for this form of the invention. The walled structures 242 may be removed at the upper end of the belt 222 and the inner door pan applied thereto to complete the door structure. The above arrangements make it practical to take advantage of the better insulating values of the foam-forming materials without being penalized by excessive high costs in the manufacture of foam insulated doors.

While the embodiment of the present invention as herein disclosed constitutes a preferred form, it is to be understood that other forms might be adopted.

What is claimed is as follows:

1. The method of insulating a series of rectangular refrigerator cabinets having flat top and side substantially impervious outer walls and rear outer walls and inner walls spaced within the outer walls and rear outer walls and inner walls spaced within the outer walls to provide an insulation space therebetween which includes placing the cabinets upon a conveyor with the rear outer wall uppermost and with the tops of each pair of cabinets facing and closely adjacent each and the bottom of each of the pairs facing and closely adjacent the bottoms of the adjacent pairs, introducing foam-forming insulation materials into the insulation space between the inner and outer walls for foaming and expansion therein, moving the cabinets in the aforesaid arrangement upon the conveyor, and applying endless belts to the side outer walls of the refrigerator cabinets as the cabinets move upon the conveyor until the foaming of the insulation materials is completed.

2. The method of insulating a series of rectangular refrigerator cabinets having flat top and side and rear outer metal walls and inner walls spaced within the outer walls to provide an insulation space therebetween which includes placing the cabinets upon a conveyor with the rear outer wall uppermost and with the tops of each pair of cabinets facing and closely adjacent each and the bottoms of each of the pairs facing and closely adjacent the bottoms of the adjacent pairs, introducing foam-forming insulation materials into the insulation space between the inner and outer walls for foaming and expansion therein, moving the cabinets in the aforesaid arrangement upon the conveyor, and applying endless belts to the side and rear outer walls of the refrigerator cabinets as the cabinets move upon the conveyor until the foaming of the insulation materials is completed.

3. The method of insulating a series of rectangular refrigerator cabinets having flat top and side and rear outer walls and inner walls spaced within the outer walls to provide an insulation space therebetween which includes introducing foam-forming insulation materials into the insulation space between the inner and outer walls for foaming and expansion therein, passing the cabinets in succession between moving endless belts on the side outer walls with the cabinets arranged alternately end for end with the tops and bottoms closely adjacent each other until the foaming of the foam-forming insulation material is substantially completed.

4. The method of insulating and preventing the bulging of the side walls of a series of rectangular refrigerator cabinets having substantially flat outer side walls and inner walls spaced within the outer walls to provide an insulation space therebetween which includes introducing foam forming materials into the insulation space between the inner and outer walls of the cabinets in succession for foaming and expansion therein, preventing the bulging of the outer side walls by passing the cabinets consecutively between moving endless belts located on the outer side walls until the foaming of the insulation material is substantially completed, and adjusting the location of the endless belts so that they are held firmly against the adjacent side walls of the cabinets for preventing the bulging of the outer side walls under internal pressures.

5. The method of introducing expansible foam forming material into a plurality of individual confining multiple sided hollow walled structures adapted to substantially confine the foam forming material and preventing the bulging of the walls of said walled structures which includes introducing the expansible foam forming material consecutively into said individual confining walled structures, and preventing the bulging of the walls of said structures by passing said structures between firmly supported moving endless belt means located in supporting relation with opposite sides of the walled structures until the foam forming materials have substantially completed their expansion.

6. The method of introducing expansible foam forming material into a plurality of individual confining multiple sided hollow walled structures adapted to substantially confine the foam forming material and preventing the bulging of the walls of said structures which includes placing said walled structures in series upon a first firmly supported moving endless belt conveyor means, introducing expansible foam forming materials consecutively into said walled structures while arranged in series upon said conveyor means, and preventing the bulging of the walls of said structures by passing the charged walled structures between said conveyor means and a second firmly supported moving endless belt means until said foam forming materials have substantially completed their expansion.

7. The method of introducing expansible foam forming material into a plurality of individual confining multiple sided hollow walled structures adapted to substantially confine the foam forming material and preventing the bulging of walls thereof which includes placing said walled structures in series upon a first firmly supported moving endless belt conveyor means, introducing expansible foam forming materials consecutively into said walled structures while arranged and moving in series upon said conveyor means, covering one side of the walled structures to completely enclose the foam forming materials, and preventing the bulging of the walled structures by passing said structures between said first conveyor means and a second firmly supported moving endless belt means until the foam forming materials have substantially completed their expansion.

8. The method of introducing expansible foam forming material into a plurality of individual confining multiple sided hollow walled structures adapted to substantially confine the foam forming material and preventing the bulging of walls of said structures which includes placing said hollow walled structures in series upon an inclined first moving conveyor means, introducing expansible foam forming materials consecutively into said walled structures while arranged in series upon said conveyor means, and preventing the bulging of said walled structures by carrying at an inclined angle each of said walled structures containing the foam forming material consecutively between said inclined first conveyor means and a second inclined moving conveyor means until said foam forming material has substantially completed its expansion.

References Cited by the Examiner

UNITED STATES PATENTS

| | | | |
|---|---|---|---|
| 3,159,514 | 12/1964 | McKnight et al. | 264—47 XR |
| 3,167,603 | 1/1965 | Lillie | 264—47 |
| 3,208,103 | 9/1965 | Voelker | 264—47 XR |

ALEXANDER H. BRODMERKEL, *Primary Examiner.*

ROBERT F. WHITE, *Examiner.*

P. E. ANDERSON, *Assistant Examiner.*